(12) United States Patent
Prentice

(10) Patent No.: US 8,601,752 B2
(45) Date of Patent: Dec. 10, 2013

(54) ADJUSTABLE SOLAR PANEL CAP

(76) Inventor: James L. Prentice, North Hills, CA (US)

( * ) Notice: Subject to any disclaimer, the term of this patent is extended or adjusted under 35 U.S.C. 154(b) by 187 days.

(21) Appl. No.: 13/248,608

(22) Filed: Sep. 29, 2011

(65) Prior Publication Data

US 2012/0233939 A1    Sep. 20, 2012

Related U.S. Application Data

(60) Provisional application No. 61/453,400, filed on Mar. 16, 2011, provisional application No. 61/477,906, filed on Apr. 21, 2011.

(51) Int. Cl.
*H02B 1/40* (2006.01)
*H02B 1/48* (2006.01)

(52) U.S. Cl.
USPC ............................ 52/173.1; 52/202; 126/621

(58) Field of Classification Search
USPC ................... 52/173.3, 200, 202, 173.1, 208; 126/621–623
See application file for complete search history.

(56) References Cited

U.S. PATENT DOCUMENTS

| | | | |
|---|---|---|---|
| 4,119,084 A * | 10/1978 | Eckels | 126/628 |
| 7,018,063 B2 | 3/2006 | Michael et al. | |
| 7,230,819 B2 * | 6/2007 | Muchow et al. | 361/601 |
| 7,476,832 B2 | 1/2009 | Vendig et al. | |
| 7,819,114 B2 | 10/2010 | Augenbraun et al. | |
| 7,828,486 B1 * | 11/2010 | Wong | 396/427 |
| 2006/0050528 A1 * | 3/2006 | Lyons et al. | 362/559 |
| 2011/0023867 A1 * | 2/2011 | Muchow et al. | 126/623 |
| 2011/0162300 A1 * | 7/2011 | Johnson | 52/173.3 |
| 2012/0181938 A1 * | 7/2012 | Kay | 315/159 |

* cited by examiner

Primary Examiner — Jeanette E. Chapman
(74) Attorney, Agent, or Firm — Kelly & Kelly, LLP

(57) ABSTRACT

A solar panel cap and light cap can be secured to a wall or parapet through the use of a common bracket. The bracket includes two vertical extensions on either side of a locking channel. The locking channel is configured to permanently receive a matching end, such that the matching end cannot come out of the locking channel once installed. Both the solar panel cap and light cap include the matching end. The solar panel caps and light caps are configured to connect to an adjacent cap such that they are electrically coupled. Either the solar panel caps or light caps can include a rechargeable battery such that energy stored during daylight hours can be used during the night.

18 Claims, 10 Drawing Sheets

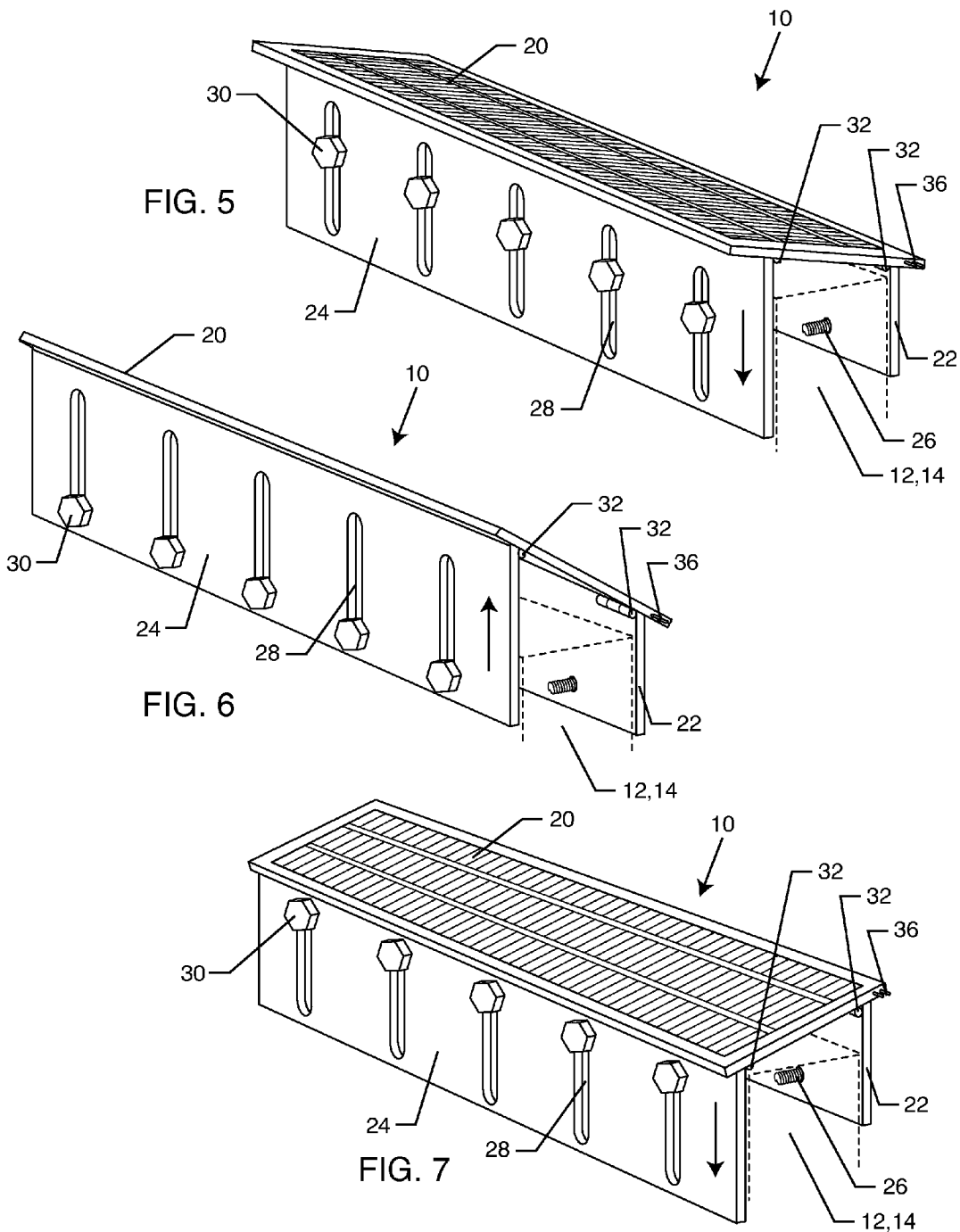

ADJUSTABLE SOLAR PANEL CAP

FIELD OF THE INVENTION

The present invention generally relates to solar panels. More particularly, the present invention relates to an adjustable solar panel which is attachable to a parapet or a wall for the operation of various electrically powered devices.

BACKGROUND OF THE INVENTION

Many buildings all across the world have a parapet. A parapet is a wall-like barrier at the edge of a roof, terrace, balcony or other structure. When extending above a roof, it may simply be the portion of an exterior wall that continues above the line of the roof surface, or may be a continuation of a vertical feature beneath the roof such as a fire wall or party wall. Historically, parapets were originally used to defend buildings from military attack, but today they are primarily used for preventing the spread of fires or for aesthetic reasons. The word parapet comes ultimately from the Italian parapetto (parare=to cover/defend and petto=breast).

Plain parapets are upward extensions of the wall, sometimes with a coping at the top and corbel below. A parapet may be used to hide a sloping roof or installed exhaust equipment. Alternatively, many firewalls are required to have a parapet, a portion of the wall extending above the roof. The parapet is required to be as fire resistant as the lower wall. It is required to extend at least 30 inches above the roof. If the roof slopes at a rate of 2 in 12 or greater (16.7 percent slope), the parapet shall extend to the same width as any portion of the floor within a fire separation distance where protection of wall openings is required, but in no case shall the height be less than 30 inches (762 mm).

Free standing walls are also common structures found throughout the world. A wall may be built as a retaining wall which is usually supporting an amount of land on one side and preventing it from sliding downward. A free standing wall can also be placed along a highway as a sound barrier or to prevent a traffic accident from going beyond the wall or to prevent the accumulation of traffic noise from becoming a nuisance to nearby residences. Whether it is a wall or a parapet, it is often in a location that receives a substantial amount of sun. This area can be optimized for use producing electricity.

Solar panels use light energy (photons) from the sun to generate electricity through the photovoltaic effect (this is the photo-electric effect). A solar panel (photovoltaic module or photovoltaic panel) is a packaged interconnected assembly of solar cells, also known as photovoltaic cells. The solar panel is used as a component in a larger photovoltaic system to offer electricity for commercial and residential applications. The structural (load carrying) member of a module can either be the top layer (superstrate) or the back layer (substrate). The majority of modules use wafer-based crystalline silicon cells or a thin-film cell based on cadmium telluride or silicon. Crystalline silicon, which is commonly used in the wafer form in photovoltaic (PV) modules, is derived from silicon, a commonly used semi-conductor. Because a single solar panel can only produce a limited amount of power, many installations contain several panels. This is known as a photovoltaic array. A photovoltaic installation typically includes an array of solar panels, an inverter, batteries and interconnection wiring.

Solar panels/arrays are commonly installed on the roof of a residential or commercial property to take advantage of the usable real estate on rooftops. Solar panels are used to generate power for the building they are installed upon and necessarily cover a large amount of surface area to generate enough usable power. Solar panel installation is typically professional installed and is therefore quite labor intensive and expensive.

There are many applications where even a small amount of solar power would be beneficial to provide for landscape lighting, motion sensor lighting, or other general electricity needs which does not require a large and costly solar panel/array installation. Also, there is a need to utilize all the available real estate possible to collect light for solar power whether it is used outside or inside. A parapet or a free standing wall is a common location which can be optimized to produce electricity.

Accordingly, there is a need for an easily installable solar panel to be attached upon a ledge which can be configured to power various electrical needs, such as lighting during the night. The present invention fulfills these needs and provides other related advantages.

SUMMARY OF THE INVENTION

The present invention relates to an adjustable solar panel cap for attachment to a parapet or wall. The adjustable solar panel cap includes a mounting bracket attachable to an upper end of the parapet or wall, and a solar panel fixed to the mounting bracket.

The mounting bracket may include a locking channel for slidably receiving and retaining at least a portion of the solar panel therein or, additionally, the mounting bracket may include a fixed mount and a slidable mount which permit the solar panel to be adjustably positionable relative to the mounting bracket. A horizontal support may also be provided which is positionable over the upper end of the parapet or wall. Pivot hinges are typically provided for connecting the solar panel to the mounting bracket.

The solar panel may comprise a plurality of solar panels wherein adjacent solar panels are electrically connected together. One or more electrically powered devices may be electrically connected to the solar panel or solar panel array. The electrically powered devices may comprise a streetlight, a building light, a battery, an outdoor electrical device, or at least one light cap attachable to the upper end of the parapet or wall.

Other features and advantages of the present invention will become apparent from the following more detailed description, taken in conjunction with the accompanying drawings which illustrate, by way of example, the principles of the inventions.

BRIEF DESCRIPTION OF THE DRAWINGS

The accompanying drawings illustrate the invention. In such drawings:

FIG. 5 is a view similar to FIG. 4, now showing adjustability of the panel downward;

FIG. 6 is a view similar to FIG. 5, now showing adjustability of the panel upward;

FIG. 7 is a view similar to FIG. 5, now showing adjustability of the panel downward;

DETAILED DESCRIPTION OF THE PREFERRED EMBODIMENTS

Figure 1:
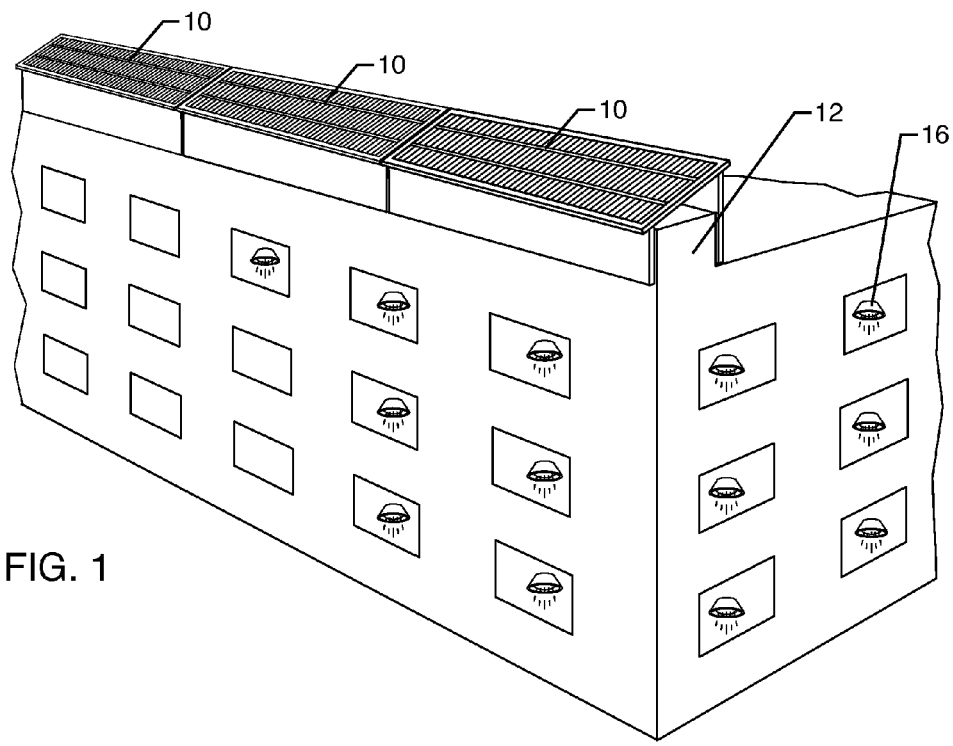
FIG. 1 is a perspective view of an exemplary adjustable solar panel cap embodying the present invention installed on a building's parapet.
Figure 2:
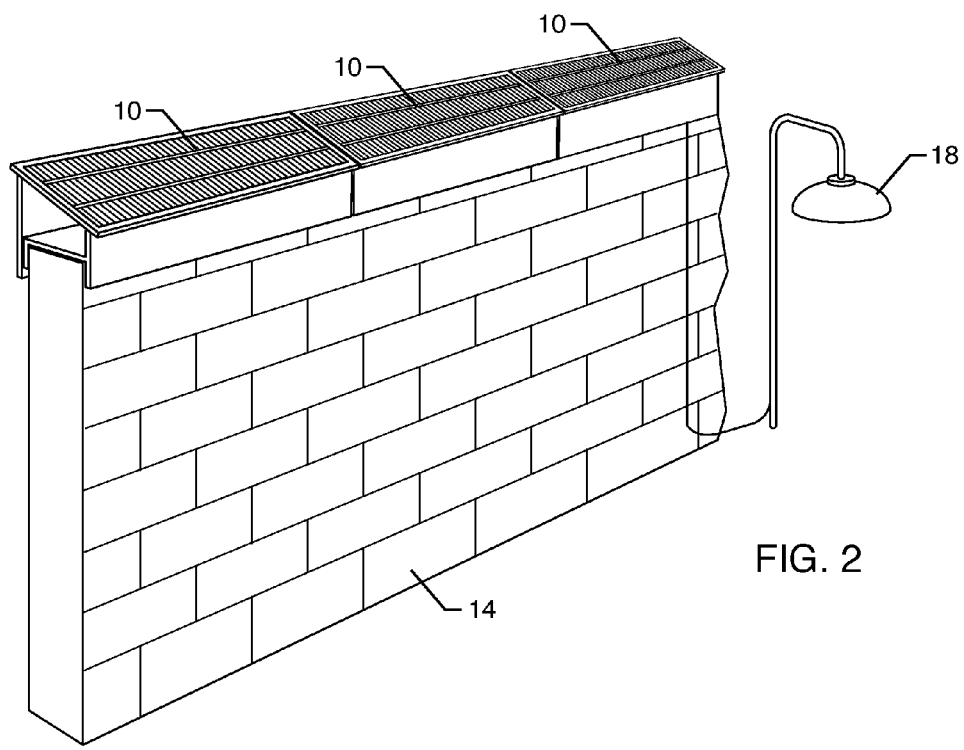
FIG. 2 is a perspective view of another exemplary adjustable solar panel cap embodying the present invention installed on a retention wall.
Figure 3:
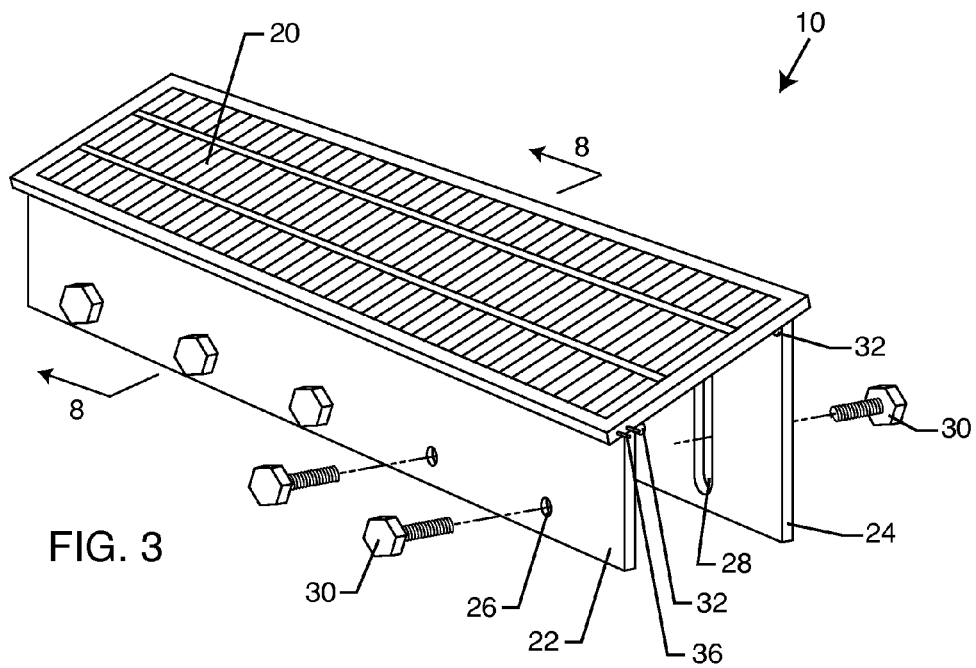
FIG. 3 is a front perspective view of the embodiment similar to FIG. 1.

As shown in the drawings for purposes of illustration, the present invention for an adjustable solar panel cap is referred to generally by the reference number 10. FIG. 1 is a perspective view of an exemplary adjustable solar panel cap 10 embodying the present invention installed on a building's parapet 12. FIG. 2 is a perspective view of another exemplary adjustable solar panel cap 10 embodying the present invention installed on a retention or free-standing wall 14. In FIG. 1, the solar panel cap 10 is configured to produce electricity for the building's lights 16. In FIG. 2, the solar panel cap 10 is configured to produce electricity for the street light 18. It is to be understood by one skilled in the art that the solar panel cap 10 can produce electricity for a variety of electronic devices and is not to be limited to the precise forms shown and described herein.

FIGS. 1 and 2 both show three sets of solar panel caps 10 installed. It is to be understood that each solar panel cap 10 can be electrically coupled to an adjacent solar panel cap 10 such that each individual solar panel cap 10 works together as a single unit. This allows additional solar panel caps 10 to be installed and simply connected to the adjacent solar panel cap 10. In this way, a long stretch of parapet 12 or wall 14 can be fully utilized to produce electricity.

FIGS. 3-10 show an exemplary adjustable solar panel cap 10 embodying the present invention. Due to the solar panel caps 10 being installed in various high risk locations, it is critical that they do not fall or blow off in the wind. For instance, placing a device onto a parapet 12 is extremely dangerous if the parapet 12 or the device falls to the ground below. This means that people can be seriously injured or even killed. Also, if the solar panel cap 10 is located along a sound barrier adjacent to a highway, it is critical that the solar panel cap 10 remain in place in spite of harsh weather conditions or else the solar panel cap 10 can fall into traffic and create a serious wreck and injury.

Figure 4:
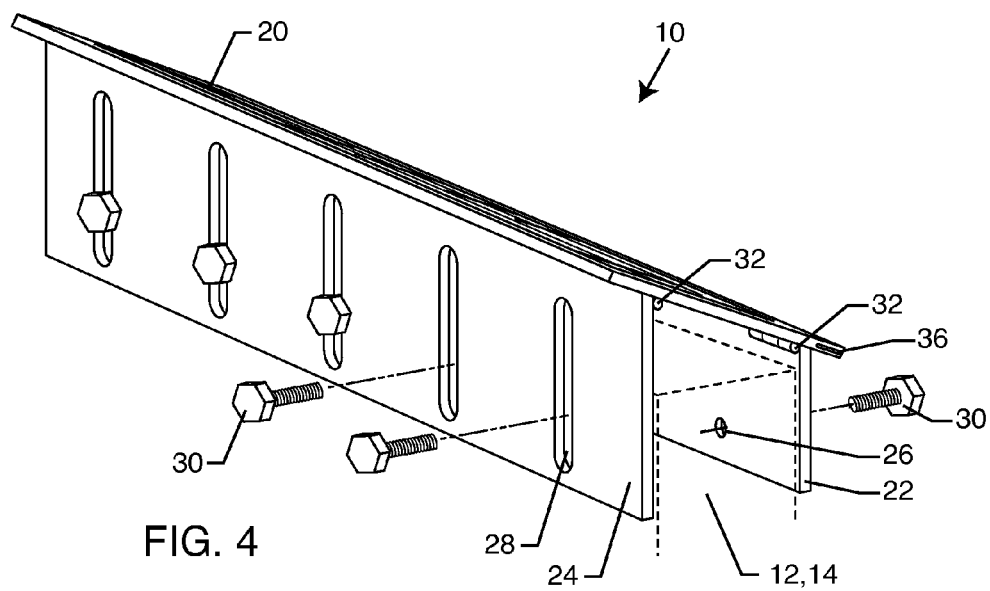
FIG. 4 is a rear perspective view of the embodiment of FIG. 3.
Figure 8:
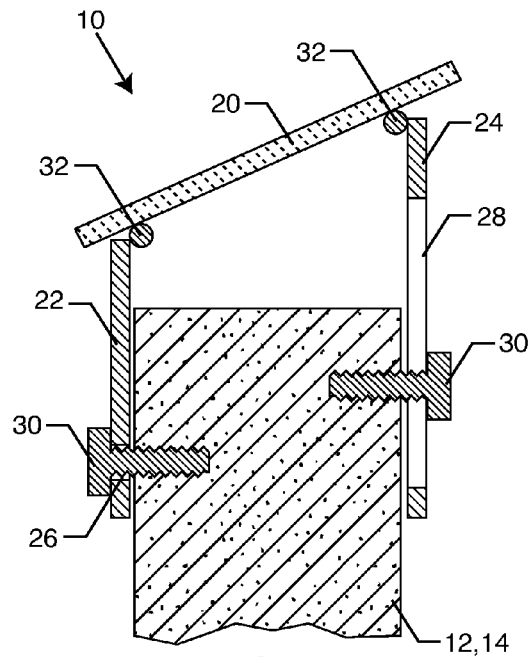
FIG. 8 is a sectional view taken along line 8-8 from FIG. 3, showing the configuration of parts in FIG. 6.
Figure 9:
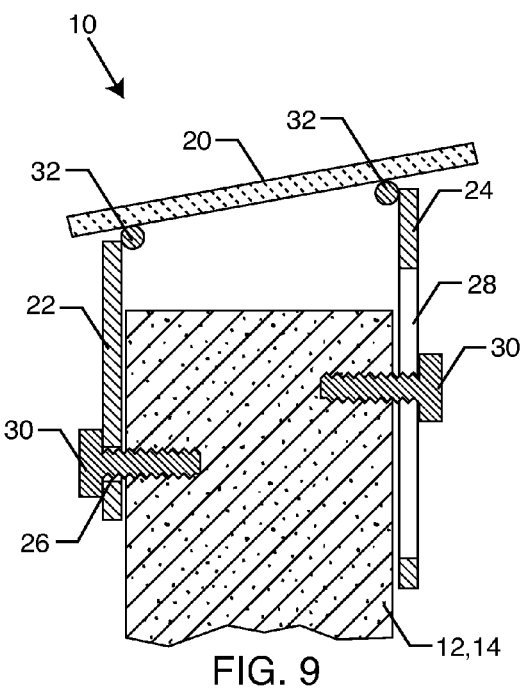
FIG. 9 is similar to FIG. 8, illustrating the configuration also shown in FIG. 5.
Figure 10:
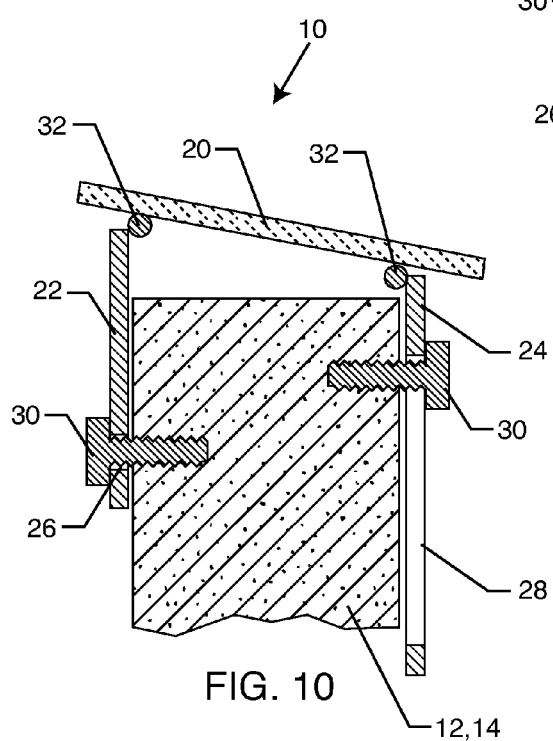
FIG. 10 is a sectional view similar to FIGS. 8 and 9, illustrating the configuration also shown in FIG. 7.
Figure 11:
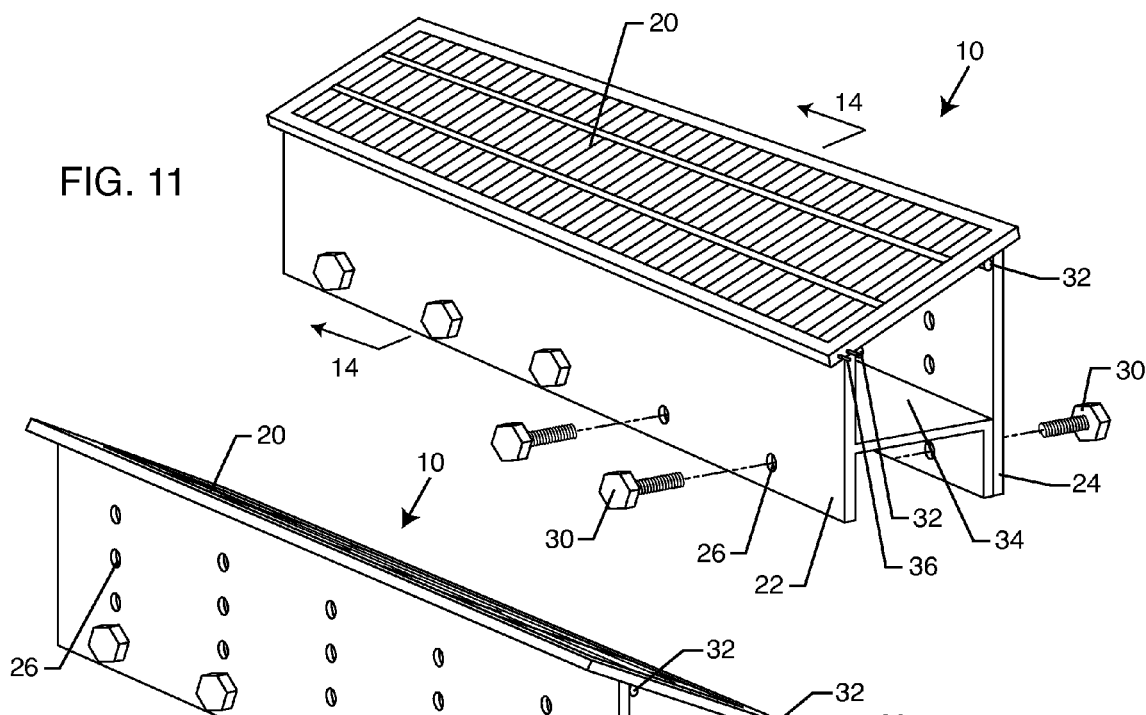
FIG. 11 is a front perspective view of the embodiment similar to FIG. 2 with a parapet support.
Figure 12:
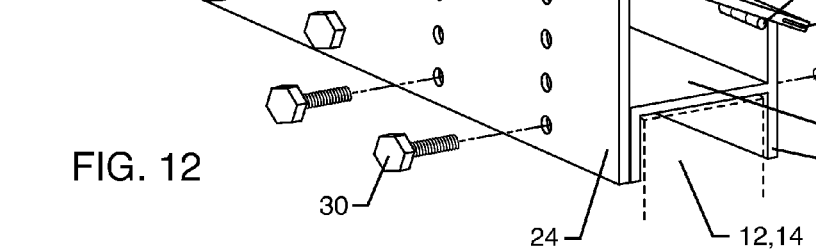
FIG. 12 is a back perspective view of the embodiment of FIG. 11.
Figure 13:
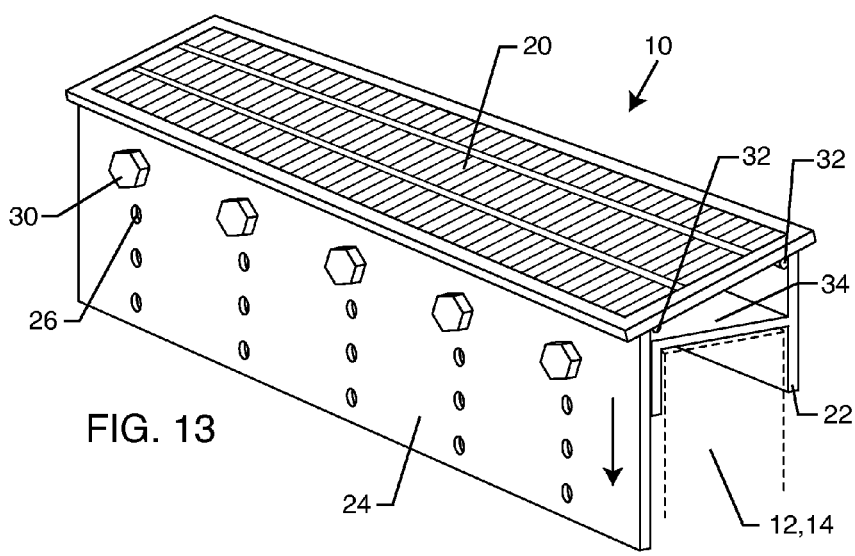
FIG. 13 is a rear perspective view of FIG. 12, now showing adjustability of the panel downward.
Figure 14:
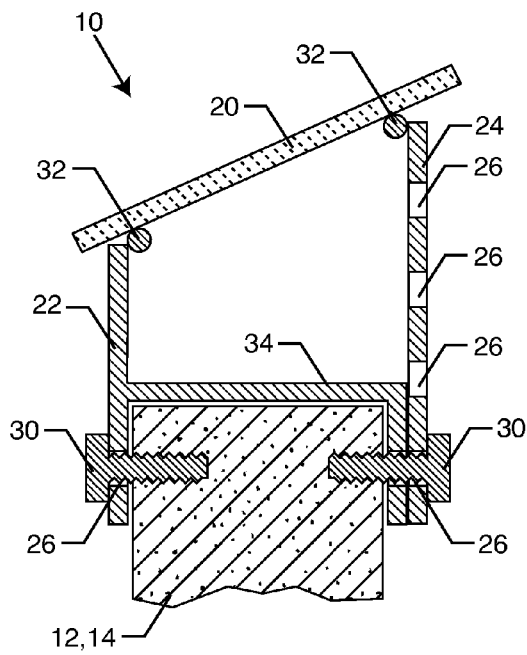
FIG. 14 is a sectional view taken along line 14-14 of FIG. 11.
Figure 15:
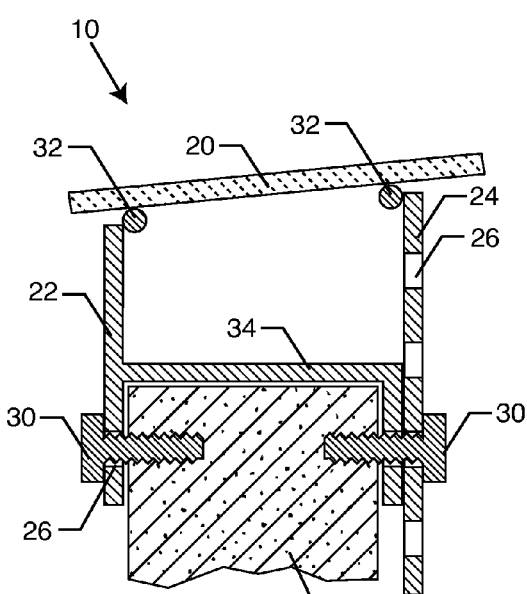
FIG. 15 is another sectional view similar to FIG. 14, now with the panel lowered.
Figure 16:
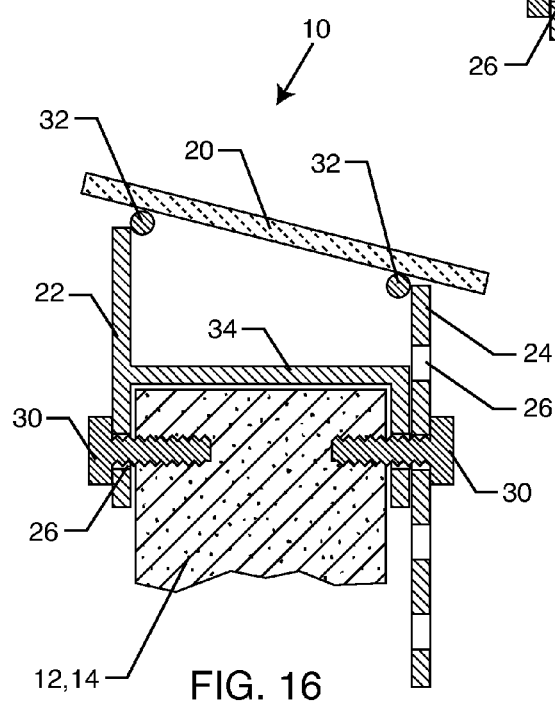
FIG. 16 is another sectional view similar to FIG. 14, now with the panel lowered even further.

The adjustable solar panel cap 10 includes a solar panel section 20 which is pivotably connected to two sides; a fixed mount 22 and a slidable mount 24. Within the fixed mount 22 are holes 26 and within the slidable mount 24 are slots 28. Both the fixed mount 22 and slidable mount 24 are pivotably connected to the solar panel section 20 at hinges 32. As shown in FIG. 4, the solar panel cap 10 is placed over a parapet 12 or wall 14. A screw 30 is then fed through the hole 26 in the fixed mount side and attached permanently to the parapet/wall 12,14. Now a second screw 30 may be fed through the slot 28 of the slidable mount 24.

The slidable mount 24 is able to move up and down relative to the parapet/wall 12, 14. This then changes the angle of the solar panel section 20 as best shown in FIGS. 5-10. Once a desired angle of the solar panel section 20 is achieved, the screws may be tightened thereby permanently securing the angle. The present invention allows the angle of the solar panel section 20 to be adjustable as setting an optimum angle produces the most amount of electricity. Depending on the climate of the parapet 12 or wall 14, and depending on the exact configuration of the parapet 12 or wall, adjustability of the solar panel section 20 is critical to optimizing the electricity produced.

FIGS. 11-16 show another exemplary embodiment of an adjustable solar panel cap 10. Now the fixed mount 22 includes a horizontal support 34 that is designed to fit over and capture a parapet 12 or wall 14. The support 34 is designed to be placed on a parapet 12 or wall 14 and not fall over or require a set of hands to hold it in place while it is being secured. Before a single screw 30 is fastened, the solar panel cap 10 can be placed upon the parapet 12 or wall 14 without the use of additional hands or supports to hold it in place. This effectively simplifies the installation process as a single worker can now install each individual screw 30 at their discretion.

The embodiment of FIGS. 11-16 is easier to install as compared to the embodiment of FIGS. 3-10. However, each embodiment includes a fixed mount 22 and a slidable mount 24 such that the solar panel section 20 can be adjusted before it is fastened into a permanent position. In the embodiment of FIGS. 11-16, the slidable mount 24 is now comprised of a plurality of holes 26 such that height can be adjusted by selecting various holes 26. It is to be understood by one skilled in the art that a slot 28 can also be used.

Various figures also show how each solar panel cap 10 can include an adjacent electrical connector 36 such that adjacent panels can be connected in series. This can ease installation and also generate a significant amount of energy when multiple solar caps 10 are used. Also, a battery can be electrically coupled to the solar panel cap 10 such that energy can be gathered and stored during daylight hours and then used later during the night.

Figure 17:
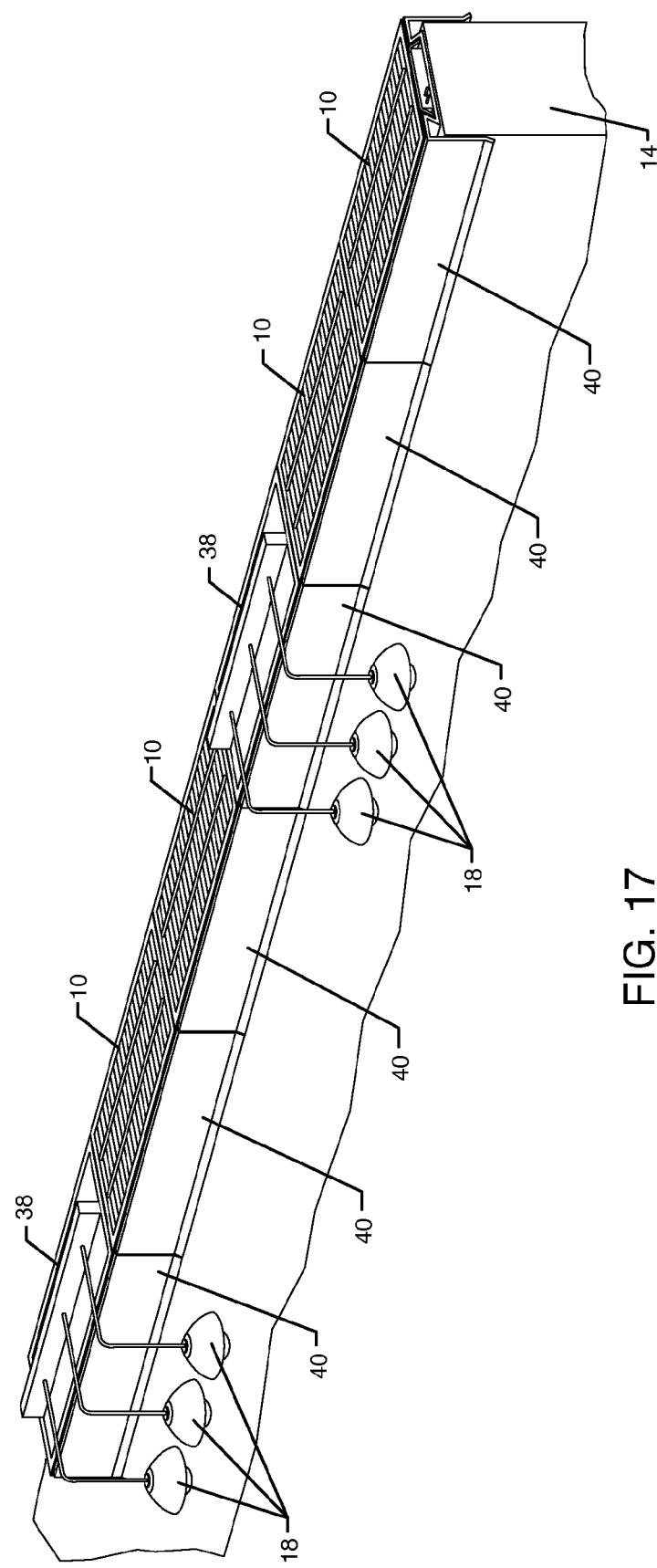
FIG. 17 is a perspective view of an exemplary plurality of solar panel caps and light caps embodying the present invention installed on a retention wall.
Figure 18:
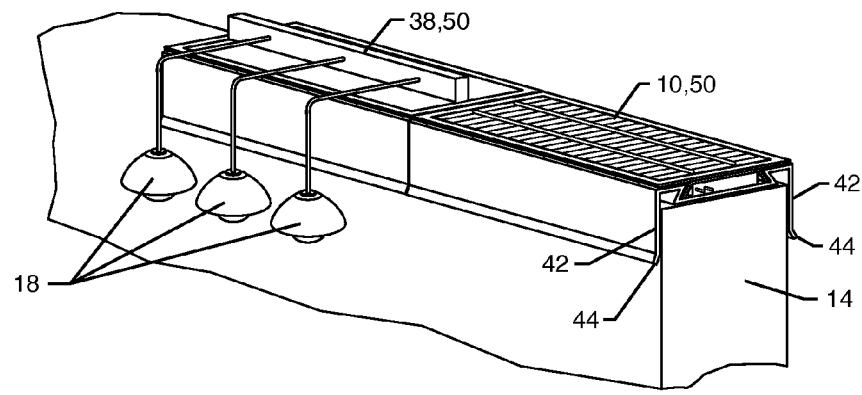
FIG. 18 is a perspective view similar to the structure of FIG. 17, now showing a single solar panel cap and light cap.
Figure 19:
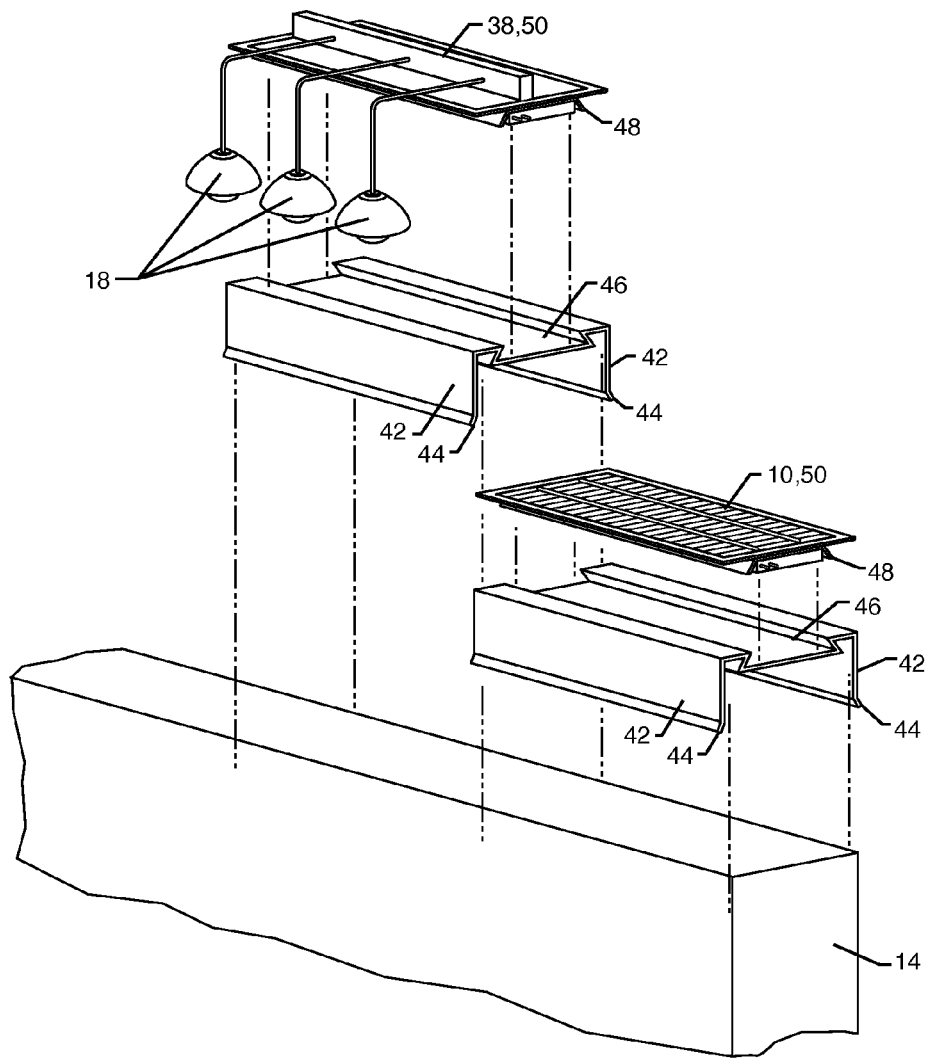
FIG. 19 is an exploded view of the structure of the FIG. 18.
Figure 20:
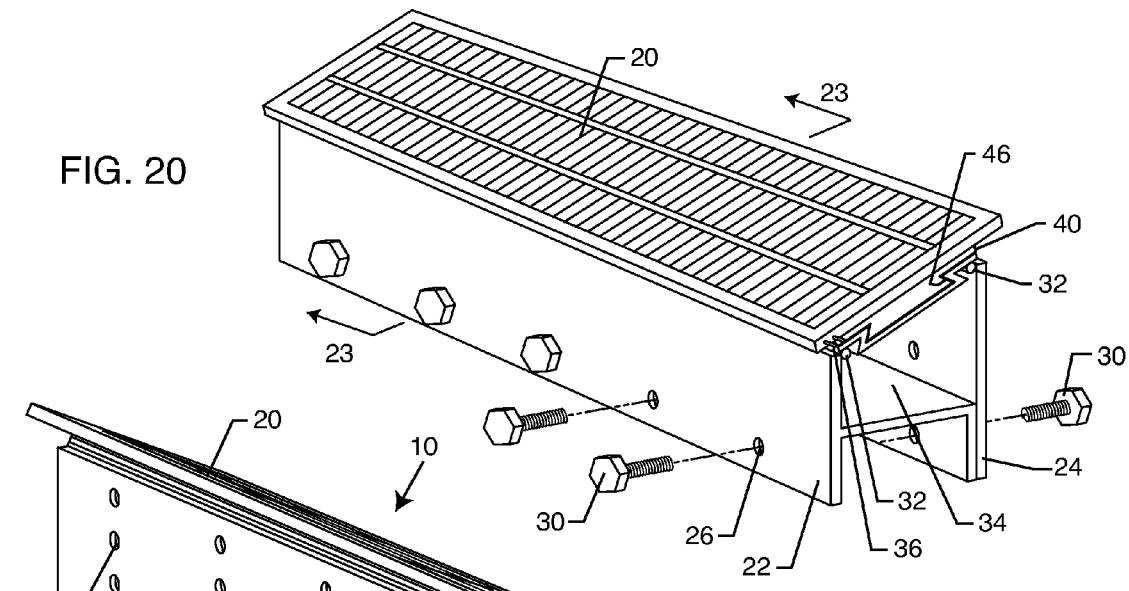
FIG. 20 is a front perspective view of an alternate embodiment that combines features of the embodiments shown in FIGS. 11-16 with the features of FIGS. 17-19.
Figure 21:
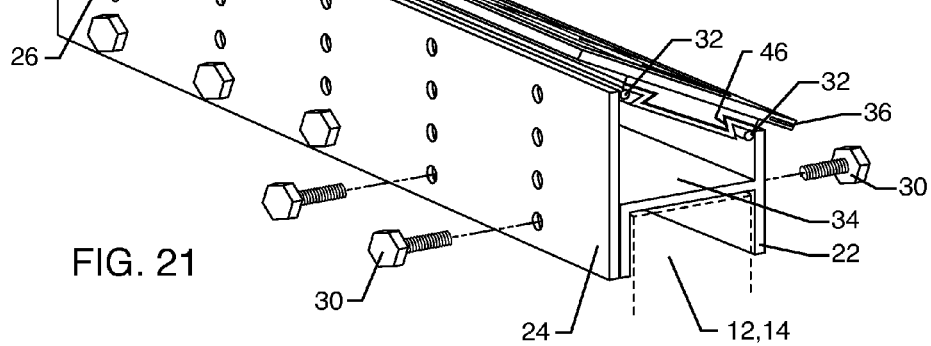
FIG. 21 is a rear perspective view of the embodiment of FIG. 20.
Figure 22:
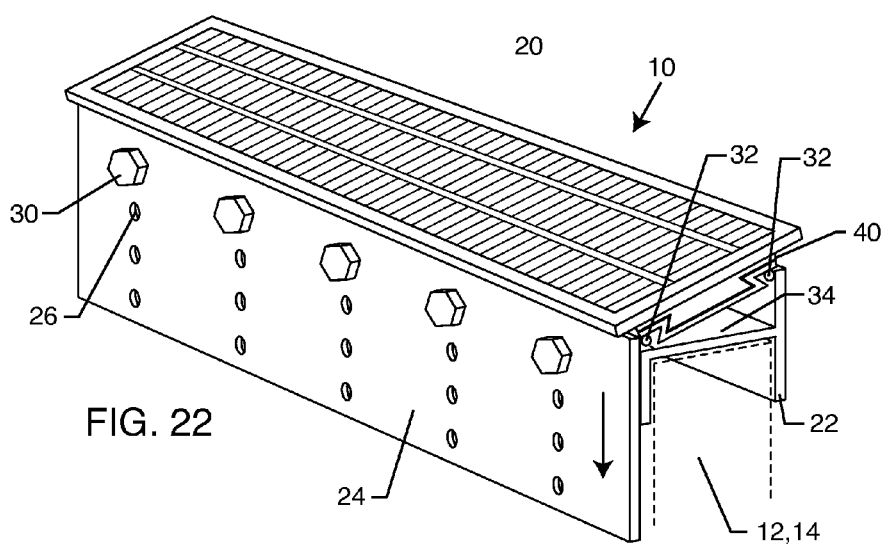
FIG. 22 is a rear perspective view of FIG. 21, now showing adjustability of the panel downward.
Figure 23:
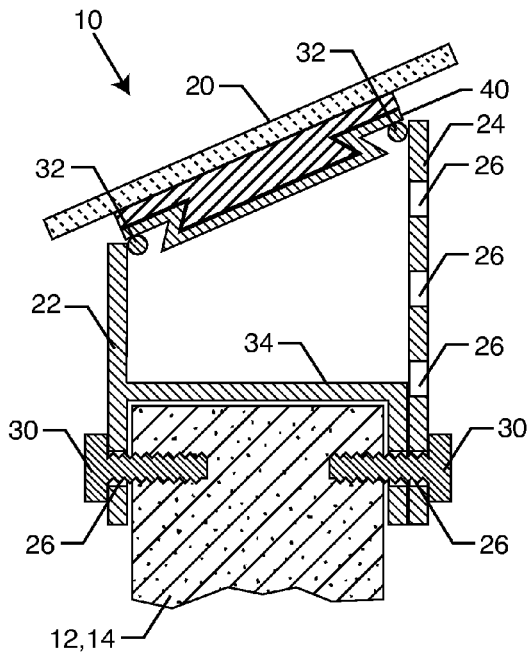
FIG. 23 is a sectional view taken along line 23-23 of FIG. 20.
Figure 24:
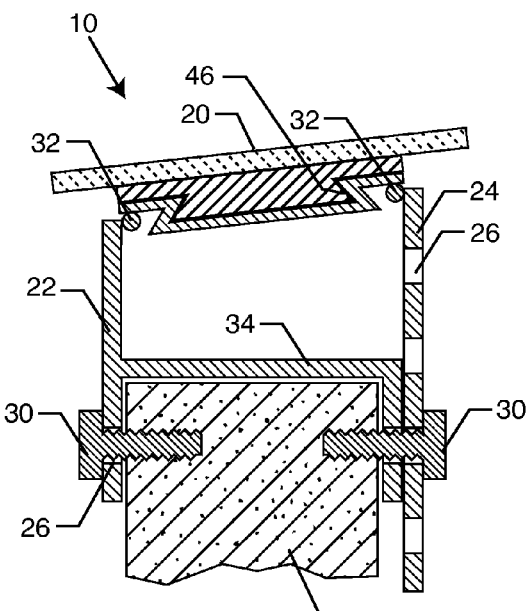
FIG. 24 is another sectional view similar to FIG. 23, now with the panel lowered.
Figure 25:
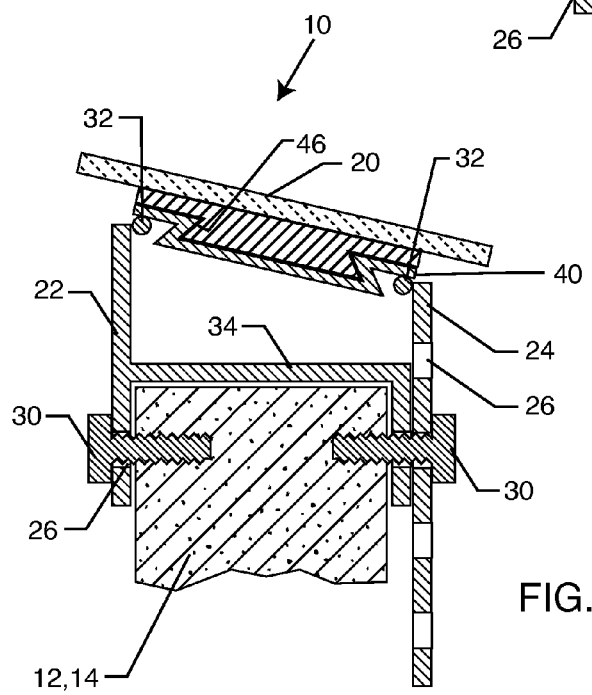
FIG. 25 is another sectional view similar to FIG. 23, now with the panel lowered even further.

FIG. 17 is a perspective view of another exemplary plurality of solar panel caps 10 and light caps 38 embodying the present invention installed on a wall 14. FIG. 18 is a perspective view similar to the structure of FIG. 17 now showing a single solar panel cap 10 and light cap 38. FIG. 19 is an exploded view of the structure of the FIG. 18.

FIGS. 17-19 illustrate another method of easily attaching a multitude of solar panel caps 10 and light caps 38 such that installation is extremely easy and quick. Due to the solar panel caps 10 being installed in various high risk locations, it is critical that they do not fall or blow off in the wind. For instance, placing a device onto a parapet 12 is extremely dangerous if the parapet 12 or the device falls to the ground below. This means that people can be seriously injured or even killed. Also, if the solar panel cap 10 is located along a sound barrier adjacent to a highway, it is critical that the solar panel cap 10 remain in place in spite of harsh weather conditions or else the solar panel cap 10 can fall into traffic and create a serious wreck and injury. However, it is also desired that installation can be accomplished quickly without the need to drill holes and use bolts and nuts to securely fasten the devices. Also, it is desired that unskilled labor can be used and the design is free from possible installation errors.

To accomplish these goals, a common bracket 40 is used to attach both the solar panel caps 10 and light caps 38. In an exemplary embodiment the bracket 40 may be designed to fit snuggly over a wall 14 by the use of two vertical extensions 42. The vertical extensions 42 extend well below the center of the bracket 40 and run along the entire longitudinal length of the bracket 40. The bracket 40 can be made of a resilient material, such as metal, which therefore allows the extensions 42 to act as springs. This is accomplished by making the distal ends 44 of the extensions 42 slightly smaller than the wall 14 it is being installed on. When the bracket 40 is forced upon a wall 14, the material of the bracket 40 will bend at the juncture between the extension arm 42 and the center of the bracket 40.

To also keep the bracket 40 installed along the wall 14, the extensions 42 must be sufficiently long such that they prevent the bracket 40 from being blown off or falling off. The longer the extensions 42, the harder it will be for the bracket 40 to fall off the wall 14. As discussed in previous embodiments, fastening means may also be used to permanently attach the brackets 40 to the wall 14.

Each bracket has a center section which includes a locking channel 46. The locking channel 46 is designed to securely retain a matching corresponding end 48. The end 48 is designed to slip within the channel 46 from the side. Once the end 48 is within the channel 46, the end 48 cannot separate from the channel 46 in the vertical direction.

Both the solar panel cap 10 and light cap 38 have the matching end 48 along their bottom surface. This means that either the solar panel cap 10 or light cap 38 can be used with the common bracket 40. Having a common bracket 40 for both the solar panel cap 10 and light cap 38 aides in the ease of installation and reduces overall costs.

It is to be understood that each solar panel cap 10 can be electrically coupled to an adjacent solar panel cap 10 or light cap 38 such that each individual solar panel cap 10 works together with other solar panel caps 10 and light caps 38 as a single unit. This allows additional solar panel caps 10 and light caps 38 to be installed and simply connected to an adjacent cap 10, 38. In this way, a long stretch of parapet 12 or wall 14 can be fully utilized to produce electricity.

It is to also be understood by one skilled in the art that each light cap 38 may include a multitude of street lights 18. Furthermore, either the solar panel cap 10 or light cap 38 may include a rechargeable battery 50 that stores energy collected during daylight hours to then be used during the night.

FIGS. 20-25 show another exemplary embodiment of an adjustable solar cap 10. This particular embodiment is essentially a combination of the embodiment shown in FIGS. 11-16 incorporated with the structure shown in FIGS. 17-19. In this regard, the fixed mount 22 includes a horizontal support 34 that is designed to fit over and capture a parapet 12 or wall 14. As was the case in the embodiment of FIGS. 11-16, this effectively simplifies the installation process as a single worker can now install each individual screw 30.

In the embodiment of FIGS. 20-25, the common bracket 40 includes a locking channel 46 and is attachable to the fixed mount 22 and slidable mount 24 by means of hinges 32. In this manner, the angle of the solar panel may be adjusted by selecting the position of the slidable mount relative to the horizontal support 34, all in much the same manner as the embodiment of FIGS. 11-16.

Of course, each solar panel can include an adjacent electrical connector 36 such that adjacent panels can be connected in series. As in other embodiments, this can ease installation and also generate a significant amount of energy when multiple solar caps 10 are used. Further, a battery can be electrically coupled to the solar panel cap 10 such that energy can be gathered and stored during daylight hours and then used later during the night.

Although several embodiments have been described in detail for purposes of illustration, various modifications may be made to each without departing from the scope and spirit of the invention. Accordingly, the invention is not to be limited, except as by the appended claims.

What is claimed is:

1. An adjustable solar panel cap for attachment to a parapet or wall, comprising:
   a mounting bracket comprising a solar panel section having first and second side edges, a fixed mount pivotally connected to the first side edge, and a slidable mount pivotably connected to the second side edge, wherein the fixed mount and slidable mount are generally planar and configured so as to be effectively permanently attached to an upper end of the parapet or wall, and wherein the fixed mount is disposed flush against a first side of the parapet or wall, and the slidable mount is disposed flush against a second side of the parapet or wall; and
   a solar panel fixed to the solar panel section of the mounting bracket.

2. The solar panel cap of claim 1, wherein the solar panel section is adjustably positionable relative to the upper end of the parapet or wall.

3. The solar panel cap of claim 1, wherein the solar panel section includes a locking channel for slidably receiving and retaining at least a portion of the solar panel therein.

4. The solar panel cap of claim 1, wherein the solar panel comprises a plurality of solar panels.

5. The solar panel cap of claim 4, wherein adjacent solar panels are electrically connected together.

6. The solar panel cap of claim 1, including one or more electrically powered devices electrically connected to the solar panel.

7. The solar panel cap of claim 6, wherein the electrically powered devices comprise a streetlight, a building light, a battery or an outdoor electrical device.

8. The solar panel cap of claim 7, wherein the electrically powered devices comprise at least one light cap attachable to the upper end of the parapet or wall.

9. The solar panel cap of claim 1, wherein the mounting bracket includes a horizontal support connected to the fixed mount and configured to be positioned over the upper end of the parapet or wall.

10. The solar panel cap of claim 1, including pivot hinges for pivotally connecting the solar panel section to the fixed mount and the slidable mount.

11. An adjustable solar panel cap for attachment to a parapet or wall, comprising:
- a mounting bracket comprising a solar panel section having first and second side edges, a fixed mount connected by a first pivot hinge to the first side edge, and a slidable mount connected by a second pivot hinge to the second side edge, wherein the fixed mount and slidable mount are generally planar and configured so as to be effectively permanently attached to an upper end of the parapet or wall, and wherein the fixed mount is disposed flush against a first side of the parapet or wall, and the slidable mount is disposed flush against a second side of the parapet or wall;
- a solar panel fixed to the solar panel section of the mounting bracket; and
- one or more electrically powered devices electrically connected to the solar panel.

12. The solar panel cap of claim 11, wherein the mounting bracket includes a horizontal support connected to the fixed mount and configured to be positioned over the upper end of the parapet or wall.

13. The solar panel cap of claim 10, wherein the solar panel section includes a locking channel for slidably receiving and retaining at least a portion of the solar panel therein.

14. The solar panel cap of claim 13, wherein the solar panel comprises a plurality of solar panels, and wherein adjacent solar panels are electrically connected together.

15. The solar panel cap of claim 11, wherein the electrically powered devices comprise a streetlight, a building light, a battery or an outdoor electrical device, wherein the electrically powered devices comprise at least one light cap attachable to the upper end of the parapet or wall.

16. An adjustable solar panel cap for attachment to a parapet or wall, comprising:
- a mounting bracket comprising a solar panel section having first and second side edges, a fixed mount pivotally connected to the first side edge, and a slidable mount pivotably connected to the second side edge, wherein the fixed mount and slidable mount are generally planar and configured so as to be effectively permanently attached to an upper end of the parapet or wall, and wherein the fixed mount is disposed flush against a first side of the parapet or wall, and the slidable mount is disposed flush against a second side of the parapet or wall; and
- a solar panel fixed to the solar panel section of the mounting bracket, wherein the solar panel section includes a locking channel for slidably receiving and retaining at least a portion of the solar panel therein; and
- wherein the solar panel section is adjustably positionable relative to the upper end of the parapet or wall.

17. The solar panel cap of claim 16, wherein the mounting bracket includes a horizontal support connected to the fixed mount and configured to be positioned over the upper end of the parapet or wall, and pivot hinges for pivotally connecting the solar panel section to the fixed mount and the slidable mount.

18. The solar panel cap of claim 16, wherein the solar panel comprises a plurality of solar panels electrically connected together, and one or more electrically powered devices are electrically connected to the solar panel, the electrically powered devices comprising a streetlight, a building light, a battery, and outdoor electrical device, or at least one cap attachable to the upper end of the parapet or wall.

* * * * *